US010060268B2

(12) United States Patent
Bradshaw

(10) Patent No.: US 10,060,268 B2
(45) Date of Patent: Aug. 28, 2018

(54) TURBINE BLADE HAVING FILM COOLING HOLE ARRANGEMENT

(71) Applicant: United Technologies Corporation, Farmington, CT (US)

(72) Inventor: Sean D. Bradshaw, Worcester, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 452 days.

(21) Appl. No.: 14/965,329

(22) Filed: Dec. 10, 2015

(65) Prior Publication Data

US 2016/0177735 A1 Jun. 23, 2016

Related U.S. Application Data

(60) Provisional application No. 62/092,989, filed on Dec. 17, 2014.

(51) Int. Cl.
| | | |
|---|---|---|
| F01D 5/18 | (2006.01) | |
| F01D 5/20 | (2006.01) | |

(52) U.S. Cl.
CPC .......... F01D 5/186 (2013.01); *F01D 5/20* (2013.01); *F05D 2240/303* (2013.01); *F05D 2240/307* (2013.01); *F05D 2250/74* (2013.01); *F05D 2260/202* (2013.01); *Y02T 50/672* (2013.01); *Y02T 50/673* (2013.01); *Y02T 50/676* (2013.01)

(58) Field of Classification Search
CPC .......... F01D 5/141; F01D 5/146; F01D 5/147
See application file for complete search history.

(56) References Cited

U.S. PATENT DOCUMENTS

| | | | |
|---|---|---|---|
| 4,653,983 A | 3/1987 | Vehr | |
| 5,370,499 A | 12/1994 | Lee | |
| 5,418,345 A | 5/1995 | Adamski | |
| 5,419,681 A | 5/1995 | Lee | |
| 5,503,529 A | 4/1996 | Anselmi et al. | |
| 6,234,755 B1 | 5/2001 | Bunker et al. | |
| 6,554,572 B2 | 4/2003 | Rinck et al. | |
| 7,086,829 B2 | 8/2006 | Fuller et al. | |
| 7,712,316 B2 | 5/2010 | Spangler | |
| 8,568,085 B2 * | 10/2013 | Di Paola | ................ F01D 5/186 415/115 |
| 2012/0084981 A1 | 4/2012 | Arikawa et al. | |

\* cited by examiner

*Primary Examiner* — Logan Kraft
*Assistant Examiner* — Sabbir Hasan
(74) *Attorney, Agent, or Firm* — Carlson, Gaskey & Olds, P.C.

(57) ABSTRACT

A turbine blade includes a platform that has a platform leading edge and trailing edge joined by two platform circumferential sides. An airfoil extends radially outwardly from the platform to a free tip end. The airfoil includes an airfoil leading edge and trailing edge joined by opposed pressure and suction sides. A root extends radially inwardly from the platform. The platform and the airfoil include film cooling holes that have external breakout points that are located in substantial conformance with the Cartesian coordinates set forth in Table 1. The Cartesian coordinates provided by an axial coordinate, a circumferential coordinate, and a radial coordinate, relative to a zero-coordinate, and the cooling holes have a diametrical surface tolerance relative to the specified coordinates of 0.200 inches (5.0 mm).

18 Claims, 4 Drawing Sheets

TURBINE BLADE HAVING FILM COOLING HOLE ARRANGEMENT

CROSS-REFERENCE TO RELATED APPLICATIONS

This application claims priority to U.S. Provisional Application No. 62/092,989, which was filed on Dec. 17, 2014 and is incorporated herein by reference.

BACKGROUND

This disclosure relates to a gas turbine engine and, more particularly, to a turbine blade that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow for the next set of blades.

Turbine vanes and blades can include film cooling features to provide a boundary layer of cooling fluid along external surfaces, which protects the airfoil from the hot combustion gases in the core flow path. Non-linear flow analyses and complex strain modeling are required to achieve good cooling, making practical results difficult to predict. Airfoil loading and temperature considerations also impose substantial design limitations, which cannot easily be generalized from one system to another.

SUMMARY

In one exemplary embodiment, a turbine blade includes a platform that has a platform leading edge and trailing edge joined by two platform circumferential sides. An airfoil extends radially outwardly from the platform to a free tip end. The airfoil includes an airfoil leading edge and trailing edge joined by opposed pressure and suction sides. A root extends radially inwardly from the platform. The platform and the airfoil include film cooling holes that have external breakout points that are located in substantial conformance with the Cartesian coordinates set forth in Table 1. The Cartesian coordinates provided by an axial coordinate, a circumferential coordinate, and a radial coordinate, relative to a zero-coordinate, and the cooling holes have a diametrical surface tolerance relative to the specified coordinates of 0.200 inches (5.0 mm).

In a further embodiment of any of the above, the turbine blade is a first stage turbine blade.

In a further embodiment of any of the above, a portion of the film cooling holes are diffusing and another portion of the film cooling holes are cylindrical.

In a further embodiment of any of the above, at least one of the film cooling holes has a hole geometry as set forth in Table 1.

In a further embodiment of any of the above, at least one film cooling hole on the airfoil is a diffusing hole and at least one film cooling hole on the platform is a cylindrical hole.

In a further embodiment of any of the above, the zero-coordinate is on a surface of the root.

In a further embodiment of any of the above, spacing between edges of adjacent cooling holes is at least 0.015 inch (0.38 mm).

In a further embodiment of any of the above, the film cooling holes extend along a free tip end and extend in a direction radially outward and downstream.

In a further embodiment of any of the above, the film cooling holes along a leading edge of the turbine blade extend radially outward.

In another exemplary embodiment, a gas turbine engine includes a compressor section. A combustor is fluidly connected to the compressor section. A turbine section is fluidly connected to the combustor. The turbine section includes an array of turbine blades. Each turbine blade includes a platform that has a platform leading edge and trailing edge joined by two platform circumferential sides. An airfoil extends radially outwardly from the platform to a free tip end. The airfoil includes an airfoil leading edge and trailing edge joined by opposed pressure and suction sides. A root extends radially inwardly from the platform. The platform and the airfoil include film cooling holes that have external breakout points that are located in substantial conformance with to the Cartesian coordinates set forth in Table 1. The Cartesian coordinates are provided by an axial coordinate, a circumferential coordinate, and a radial coordinate, relative to a zero-coordinate. The cooling holes have a diametrical surface tolerance relative to the specified coordinates of 0.200 inches (5.0 mm).

In a further embodiment of any of the above, the turbine blade is a first stage turbine blade.

In a further embodiment of any of the above, a portion of the film cooling holes are diffusing and another portion of the film cooling holes are cylindrical.

In a further embodiment of any of the above, at least one of the film cooling holes has a hole geometry as set forth in Table 1.

In a further embodiment of any of the above, at least one film cooling hole on the airfoil is a diffusing hole and at least one film cooling hole on the platform is a cylindrical hole.

In a further embodiment of any of the above, the zero-coordinate is on a surface of the root.

In a further embodiment of any of the above, spacing between edges of adjacent cooling holes is at least 0.015 inch (0.38 mm).

In a further embodiment of any of the above, the film cooling holes extend along a free tip end and extend in a direction radially outward and downstream.

In a further embodiment of any of the above, the film cooling holes along a leading edge of the turbine blade extend radially outward.

The various features and advantages of this disclosure will become apparent to those skilled in the art from the following detailed description. The drawings that accompany the detailed description can be briefly described as follows.

DETAILED DESCRIPTION

Figure 1:
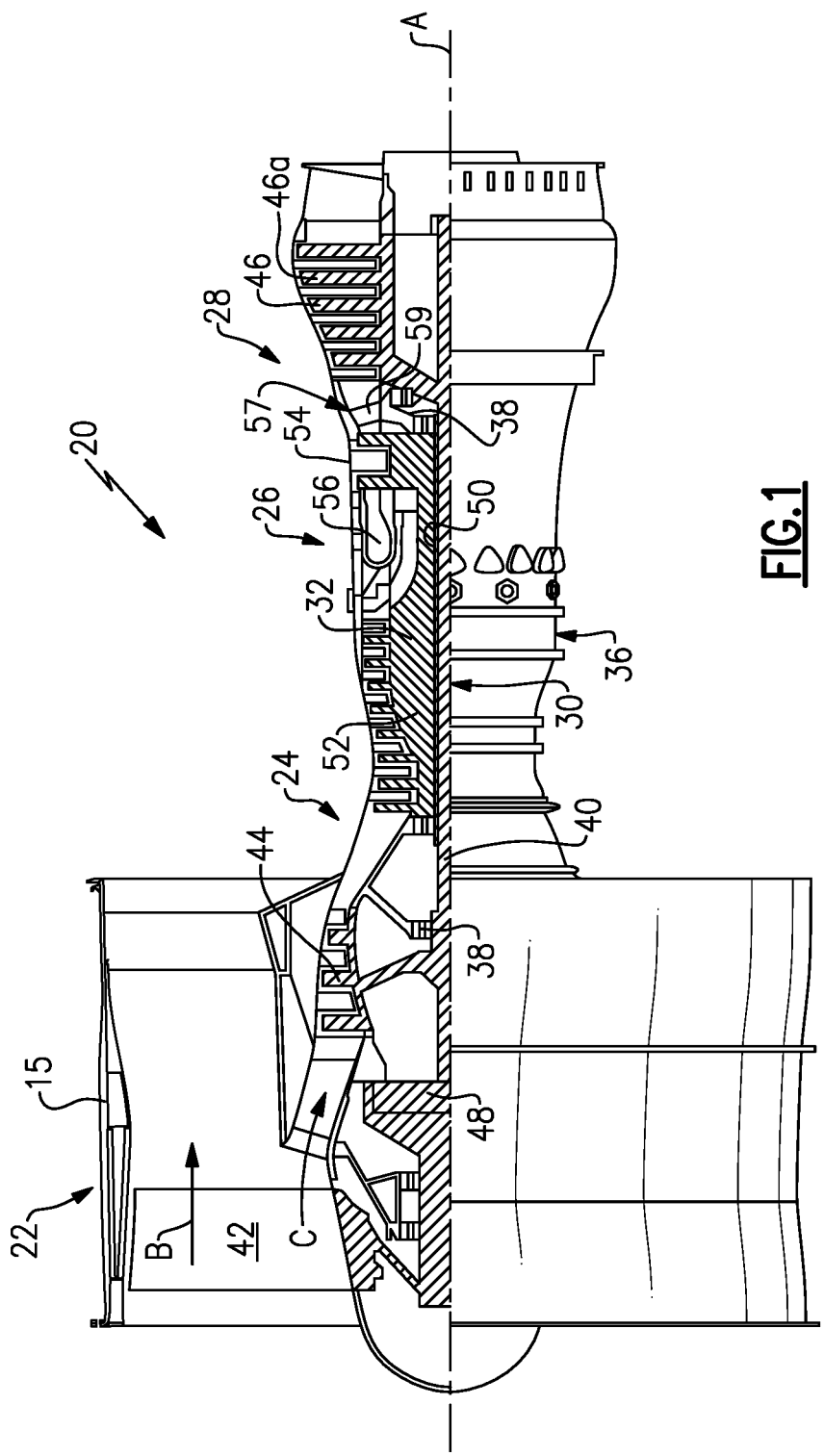
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
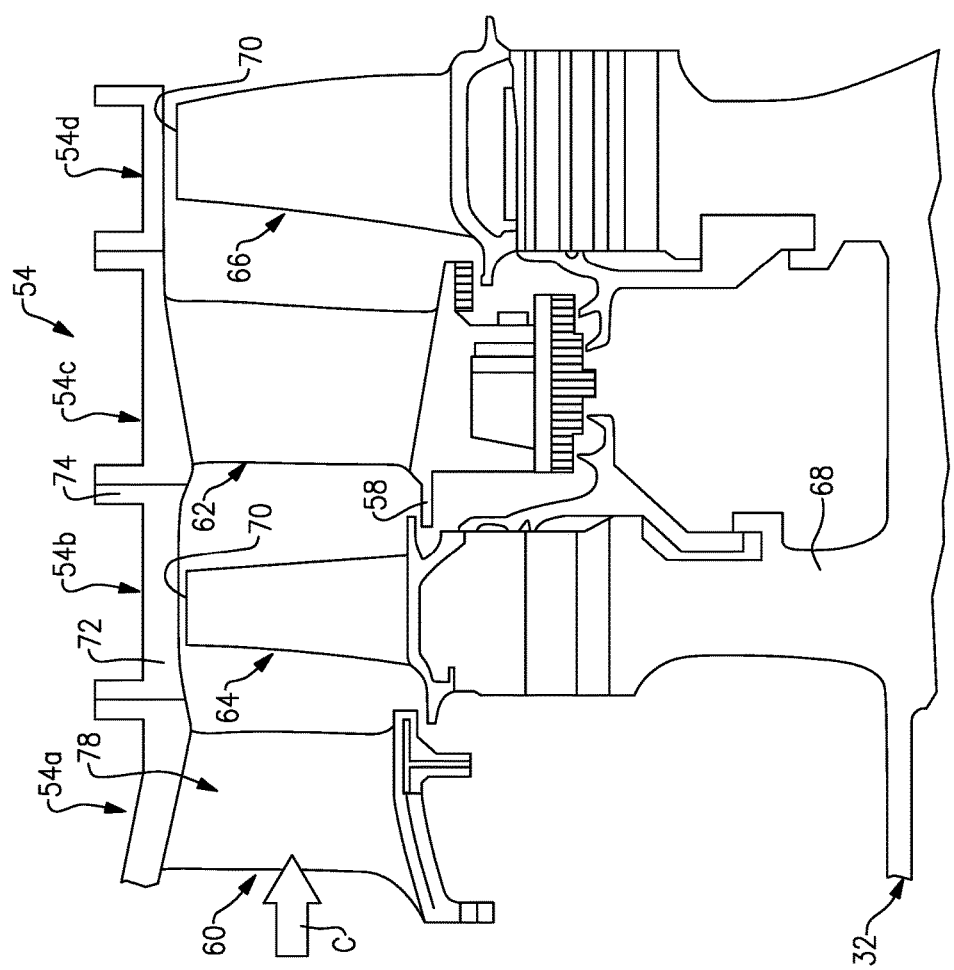
FIG. 2 illustrates selected portions of a high pressure turbine of the gas turbine engine.

FIG. 2 illustrates a cross-sectional view of a portion of the high pressure turbine section 54. The high pressure turbine section 54 includes first and second arrays 54a, 54c of circumferentially spaced fixed vanes 60, 62. The arrays 54a, 54c are axially spaced apart from one another. A first stage array 54b of circumferentially spaced turbine blades 64, mounted to a rotor disk 68, is arranged axially between the first and second fixed vane arrays 54a, 54c. A second stage array 54d of circumferentially spaced turbine blades 66 is arranged aft of the second array 54c of fixed vanes 62. A platform 58 of the second fixed vane array 62 is arranged in an overlapping relationship with the turbine blades 64, 66.

The turbine blades 64, 66 each include a free tip end 70 adjacent to a blade outer air seal 72 of a case structure 74. The first and second stage arrays 54a, 54c of turbine vanes and first and second stage arrays 54b, 54d of turbine blades are arranged within the core flow path C and are operatively connected to the high speed spool 32.

Figure 3:
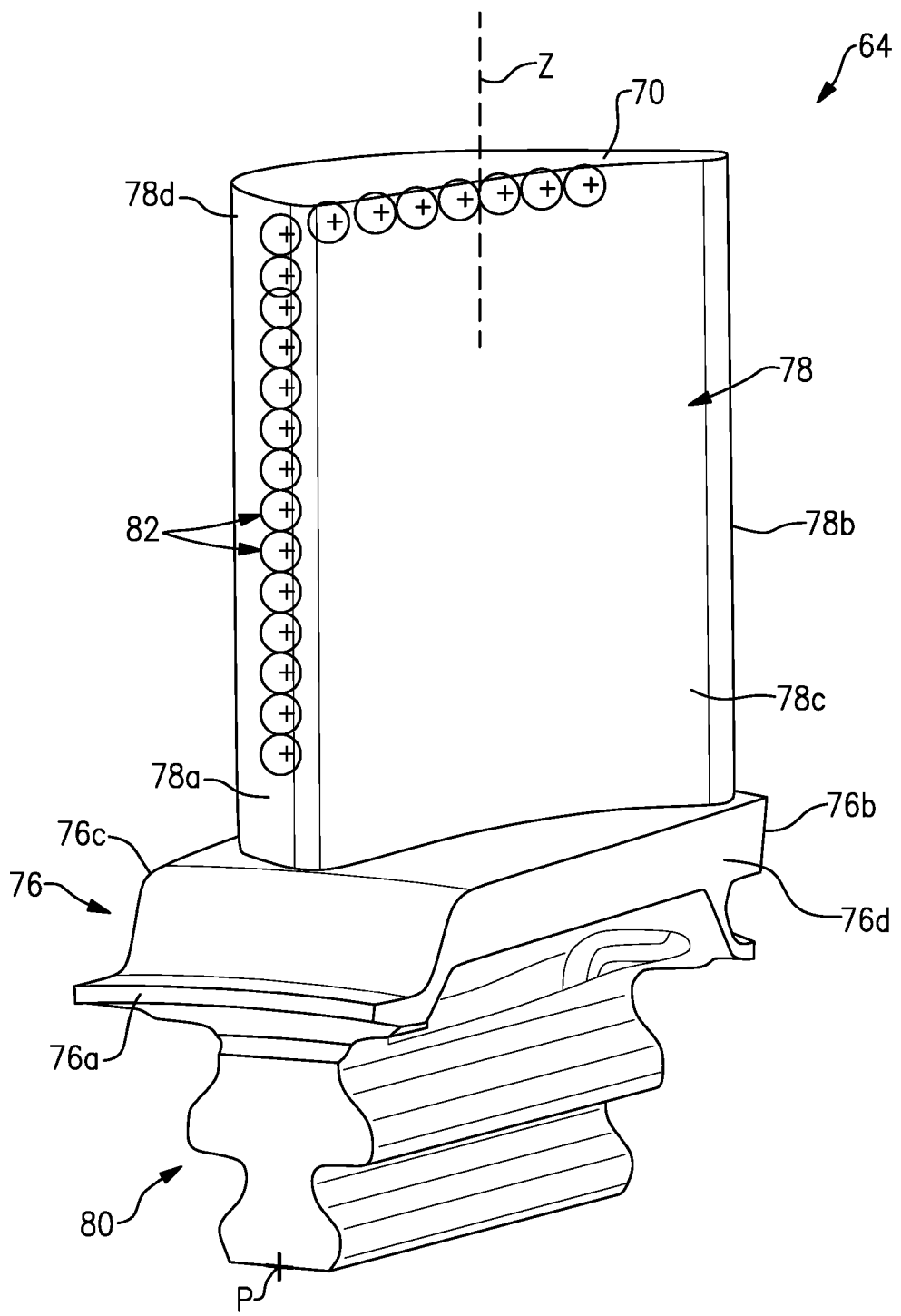
FIG. 3 illustrates a perspective view from a pressure side of a representative blade of the high pressure turbine section.

FIG. 3 shows a perspective view of a representative one of the turbine blades 64. In this example, the turbine blade 64 is a first stage turbine blade of the high pressure turbine 54. The turbine blade 64 includes a platform 76 that has a platform leading edge 76a and trailing edge 76b joined by two platform circumferential sides 76c and 76d. An airfoil 78 extends radially outwardly from the platform along Z-axis to the free tip end 70. The Z-axis is perpendicular to the engine axis A. The airfoil 78 includes an airfoil leading edge 78a and trailing edge 78b joined by opposed pressure 78c and suction sides 78d. A root 80 extends radially inwardly from the platform 76.

The turbine blade 64 is formed of a high strength, heat resistant material, such as but not limited to a nickel-based or cobalt-based super alloy, or a high temperature, stress-resistant ceramic or ceramic composite material. In cooled configurations, internal fluid passages and external cooling apertures provide for a combination of convection and film cooling. In addition, one or more thermal barrier coatings, abrasion-resistant coatings or other protective coatings may be applied to the turbine blade 64.

With regard to cooling, the airfoil 78 includes film cooling holes, generally shown at 82, arranged in substantial conformance with the Cartesian coordinates set forth in Table 1 below. The Cartesian coordinates are provided by an axial coordinate (Xo), a circumferential coordinate (Yo), and a radial coordinate (Zo), relative to a reference point or zero-coordinate. The axial coordinate is along a direction parallel to the engine axis A. The radial coordinate is along a direction perpendicular to the engine axis A, and the circumferential coordinate is along a circumferential direction about the engine axis A. The coordinates of Table 1 (in inches) provide the nominal axial, circumferential, and radial coordinates relative to a reference zero-coordinate, P, on a cold, uncoated, stationary blade. In this example, the zero-coordinate P is on the root 80, at a mid-point of the leading edge of the root 80.

Each row in Table 1 corresponds to a single film cooling hole 82 location. Thus, in this example, there are 21 film cooling holes 82 on the blade 64. Additional elements such as additional cooling holes, protective coatings, fillets and seal structures may also be formed onto the external surfaces of the turbine blade 64 surface, but these elements are not necessarily described by the coordinates.

The locations of the film cooling holes 82 are represented in the figures with a "+" symbol that corresponds to the centerline of the cooling film holes 82 where the holes open at the surface. Due to manufacturing tolerances, the film cooling holes 82 have a diametrical surface tolerance, relative to the specified coordinates, of 0.200 inches (5.0 mm). This tolerance is represented by the circle around each "+" symbol. That is, the circle represents the spatial envelope in which the film cooling hole 82 is located. In a further example, a minimum spacing is provided between adjacent film cooling holes 82. In one example, the minimum spacing between edges of adjacent film cooling holes 82 is at least 0.015 inch (0.38 mm).

Figure 4:
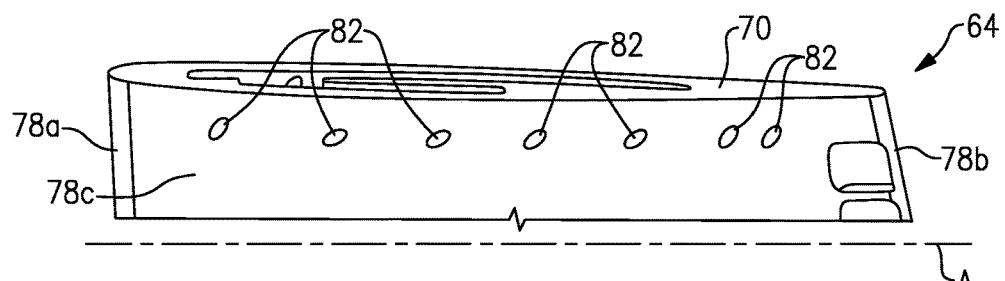
FIG. 4 illustrates the pressure side of the representative blade of the high pressure turbine section adjacent a free tip end.
Figure 5:
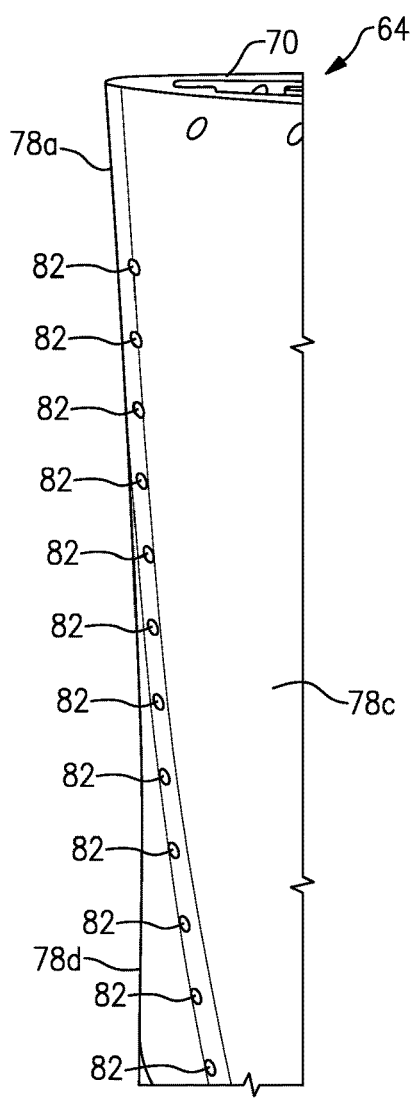
FIG. 5 illustrates the pressure side of the representative blade of the high pressure turbine section adjacent a leading edge.

FIG. 4 illustrates a region of the turbine blade 64 surrounding the free tip end 70. The film cooling holes 82 are directed radially outward and downstream relative to the axis A. In the illustrated example, the film cooling holes 82 are directed downstream and radially outward at an angle between 35 and 60 degrees relative to the axis A. In another example, the film cooling holes 82 are directed downstream and radially outward at an angle between 40 and 50 degrees. The angle of each of the film cooling holes 82 along the free tip end 70 may vary relative to an adjacent film cooling hole 82. Additionally, the film cooling holes 82 located along the airfoil leading edge 78a of the turbine blade 64 extend in a direction radially outward as shown in FIG. 5. In the illustrated example, there are only a single row of film cooling holes 82 along the free tip end 70 and a single column of film cooling holes 82 along the airfoil leading edge 78a.

The film cooling holes 82 are arranged to produce boundary layers of cooling fluid on the gas path side of the platform 76 and external surfaces of the airfoil 78. As shown, portions of the film cooling holes 82 are arranged radially along the airfoil leading edge 78a and axially along the free tip end 70. The film cooling holes 82 can be diffusing holes or cylindrical holes, for example, but are not limited to such geometries. In diffusing hole geometries, the hole area increases as the hole opens to the external surface. Some examples of diffusing holes include, but are not limited to, conical, shaped, and vehr holes. Cylindrical holes have a uniform diameter area along the length of the hole. In further examples, a portion of the film cooling holes 82 are cylindrical holes and another portion are diffusing holes.

Diffusing holes can provide good film coverage in comparison with a cylindrical hole of the same size. Diffusing holes can be used where enhanced cooling is desired. Cylindrical holes can provide higher velocity cooling flow in comparison to diffusing holes of the same size. Cylindrical holes can be used at locations where increased velocity is needed to better match the velocity of fluid along the core flow path C. In one further example, the film cooling holes 82 have a diameter of 0.010-0.035 inch (0.25-0.89 mm).

TABLE 1

| Hole # | Xo | Yo | Zo | Tolerance Zone |
|---|---|---|---|---|
| 1 | 0.228 | 0.018 | 1.410 | 0.200 |
| 2 | 0.236 | 0.064 | 1.549 | 0.200 |
| 3 | 0.252 | 0.109 | 1.688 | 0.200 |
| 4 | 0.279 | 0.152 | 1.827 | 0.200 |
| 5 | 0.314 | 0.196 | 1.965 | 0.200 |
| 6 | 0.353 | 0.240 | 2.104 | 0.200 |
| 7 | 0.388 | 0.281 | 2.242 | 0.200 |
| 8 | 0.417 | 0.315 | 2.381 | 0.200 |
| 9 | 0.439 | 0.346 | 2.519 | 0.200 |
| 10 | 0.461 | 0.373 | 2.658 | 0.200 |
| 11 | 0.483 | 0.400 | 2.796 | 0.200 |
| 12 | 0.509 | 0.425 | 2.935 | 0.200 |
| 13 | 0.533 | 0.494 | 3.071 | 0.200 |
| 14 | 0.564 | 0.534 | 3.211 | 0.200 |
| 15 | 0.600 | 0.345 | 3.220 | 0.200 |
| 16 | 0.682 | 0.165 | 3.220 | 0.200 |
| 17 | 0.771 | 0.023 | 3.220 | 0.200 |
| 18 | 0.865 | −0.107 | 3.220 | 0.200 |
| 19 | 0.968 | −0.238 | 3.220 | 0.200 |
| 20 | 1.065 | −0.357 | 3.221 | 0.200 |
| 21 | 1.108 | −0.412 | 3.220 | 0.200 |

Substantial conformance with the coordinate of Table 1 is based on points representing the film cooling hole 82 locations, for example in inches or millimeters, as determined by selecting particular values of scaling parameters. A substantially conforming blade has film cooling holes that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified blade, or that the part or structure is sufficiently the same with respect to a part design in a type-certified or type-certificated blade, such that the part or structure complies with airworthiness standards applicable to the specified blade. In particular, substantial conformance encompasses any regulatory determination that a particular part or structure is sufficiently similar to, identical to, or the same as a specified blade, such that certification or authorization for use is based at least in part on the determination of similarity.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

The invention claimed is:

1. A turbine blade comprising:
    a platform that has a platform leading edge and trailing edge joined by two platform circumferential sides;
    an airfoil that extends radially outwardly from the platform to a free tip end, the airfoil includes an airfoil leading edge and trailing edge joined by opposed pressure and suction sides; and
    a root that extends radially inwardly from the platform, and
    the platform and the airfoil include film cooling holes having external breakout points that are located in substantial conformance with the Cartesian coordinates set forth in Table 1, the Cartesian coordinates provided by an axial coordinate, a circumferential coordinate, and a radial coordinate, relative to a zero-coordinate, and the cooling holes have a diametrical surface tolerance relative to the specified coordinates of 0.200 inches, wherein the zero-coordinate is on the root, at a midpoint of the leading edge of the root.

2. The turbine blade as recited in claim 1, wherein the turbine blade is a first stage turbine blade.

3. The turbine blade as recited in claim 1, wherein a portion of the film cooling holes are diffusing and another portion of the film cooling holes are cylindrical.

4. The turbine blade as recited in claim 1, wherein at least one of the film cooling holes has a hole geometry as set forth in Table 1.

5. The turbine blade as recited in claim 1, wherein at least one film cooling hole on the airfoil is a diffusing hole and at least one film cooling hole on the platform is a cylindrical hole.

6. The turbine blade as recited in claim 1, wherein the zero-coordinate is on a surface of the root.

7. The turbine blade as recited in claim 1, wherein spacing between edges of adjacent cooling holes is at least 0.015 inch.

8. The turbine blade as recited in claim 1, wherein the film cooling holes extending along a free tip end extend in a direction radially outward and downstream.

9. The turbine blade as recited in claim 1, wherein the film cooling holes along the leading edge of the turbine blade extend radially outward.

10. A gas turbine engine comprising:
    a compressor section;
    a combustor fluidly connected to the compressor section;
    a turbine section fluidly connected to the combustor, the turbine section includes an array of turbine blades, each turbine blade comprising:
    a platform that has a platform leading edge and trailing edge joined by two platform circumferential sides;
    an airfoil that extends radially outwardly from the platform to a free tip end, the airfoil includes an airfoil leading edge and trailing edge joined by opposed pressure and suction sides; and
    a root that extends radially inwardly from the platform, and
    the platform and the airfoil include film cooling holes having external breakout points that are located in substantial conformance with to the Cartesian coordinates set forth in Table 1, the Cartesian coordinates provided by an axial coordinate, a circumferential coordinate, and a radial coordinate, relative to a zero-coordinate, and the cooling holes have a diametrical surface tolerance relative to the specified coordinates of 0.200 inches, wherein the zero-coordinate is on the root, at a midpoint of the leading edge of the root.

11. The gas turbine engine as recited in claim 10, wherein the turbine blade is a first stage turbine blade.

12. The gas turbine engine as recited in claim 10, wherein a portion of the film cooling holes are diffusing and another portion of the film cooling holes are cylindrical.

13. The gas turbine engine as recited in claim 10, wherein at least one of the film cooling holes has a hole geometry as set forth in Table 1.

14. The gas turbine engine as recited in claim 10, wherein at least one film cooling hole on the airfoil is a diffusing hole and at least one film cooling hole on the platform is a cylindrical hole.

15. The gas turbine engine as recited in claim 10, wherein the zero-coordinate is on a surface of the root.

16. The gas turbine engine as recited in claim 10, wherein spacing between edges of adjacent cooling holes is at least 0.015 inch.

17. The gas turbine engine as recited in claim 10, wherein the film cooling holes extending along a free tip end extend in a direction radially outward and downstream.

18. The gas turbine engine as recited in claim 10, wherein the film cooling holes along the leading edge of the turbine blade extend radially outward.

* * * * *